April 23, 1963
C. B. RICHARDSON
3,086,905
APPARATUS AND PROCESS FOR CONTINUOUSLY
TESTING CONTROLLING STOCK FREENESS
Filed Dec. 11, 1958
3 Sheets-Sheet 1
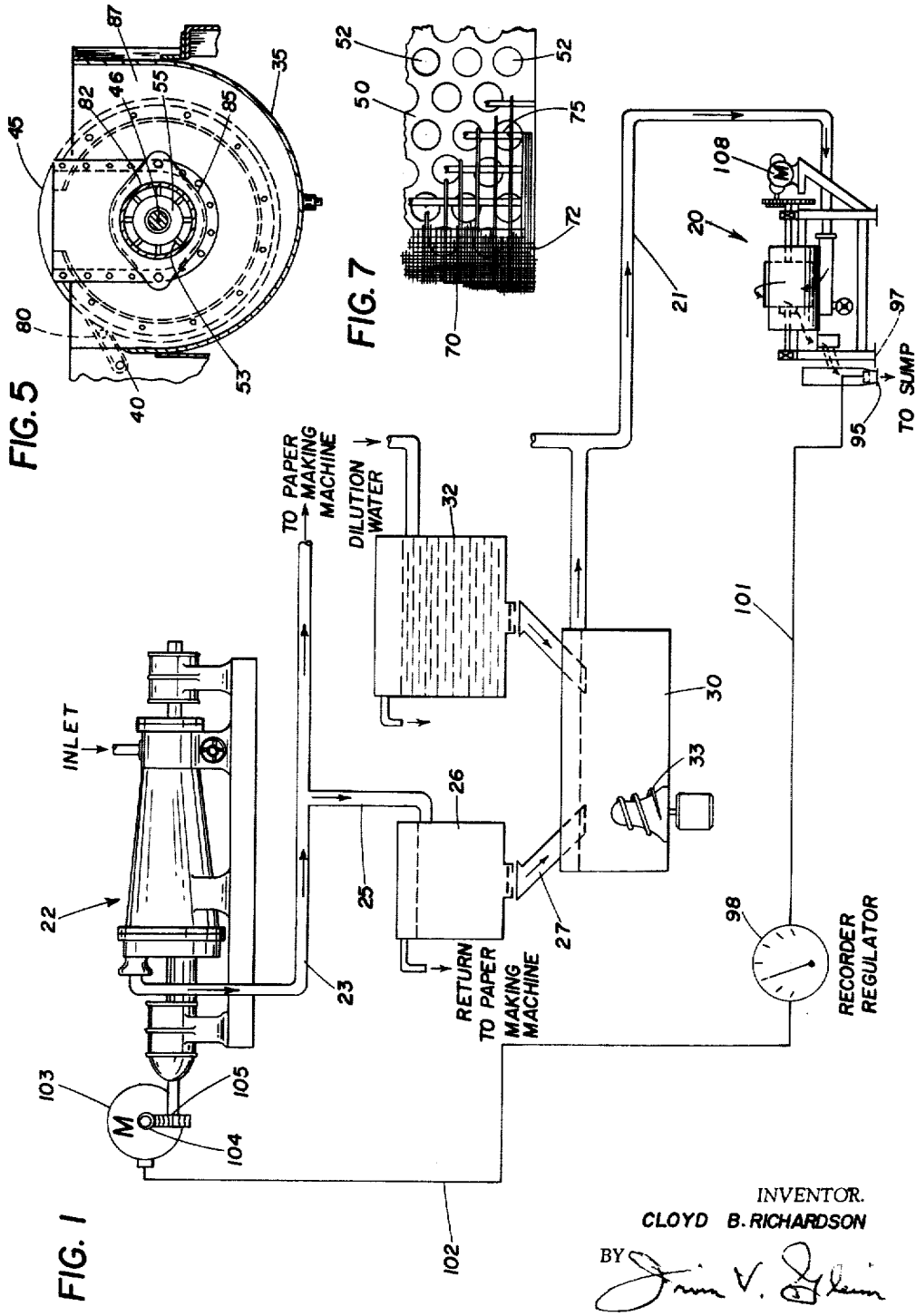
INVENTOR.
CLOYD B. RICHARDSON
BY 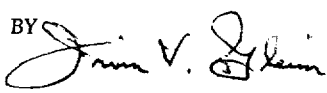
ATTORNEY April 23, 1963 C. B. RICHARDSON 3,086,905
APPARATUS AND PROCESS FOR CONTINUOUSLY
TESTING CONTROLLING STOCK FREENESS
Filed Dec. 11, 1958 3 Sheets-Sheet 2
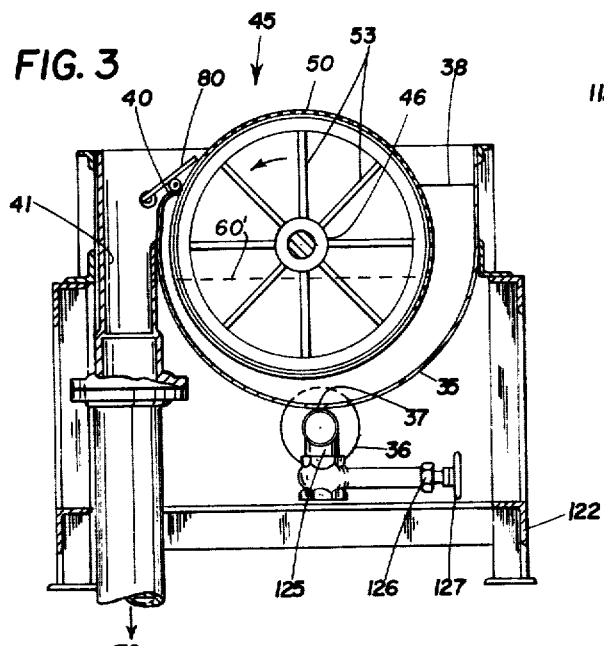
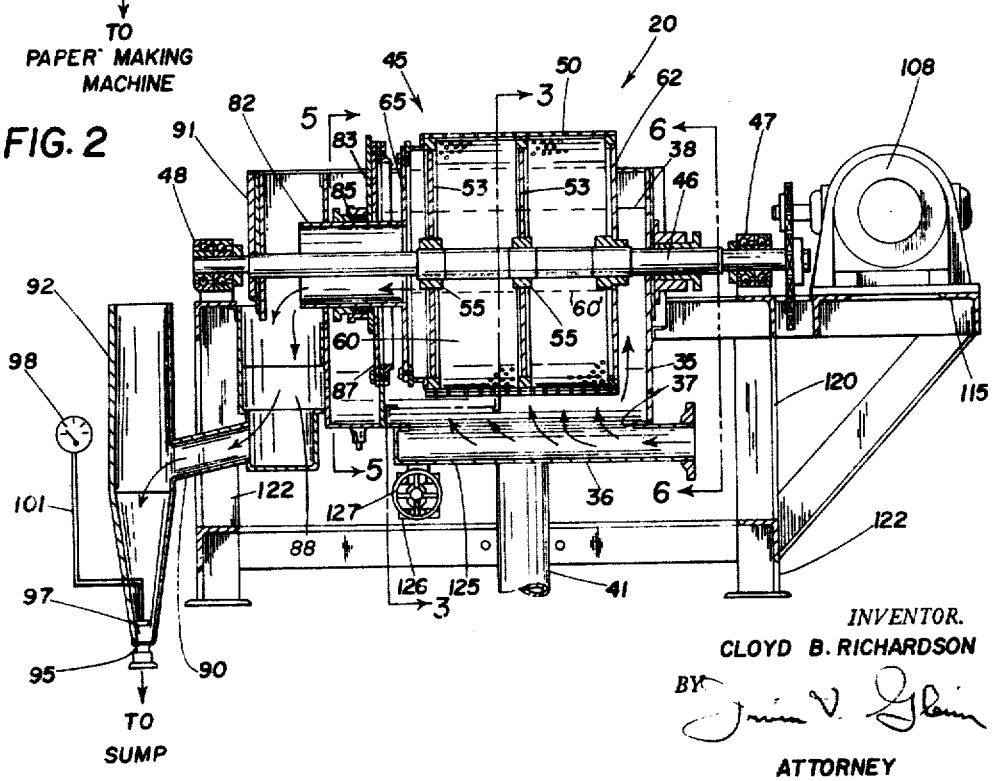
INVENTOR.
CLOYD B. RICHARDSON
BY
ATTORNEY

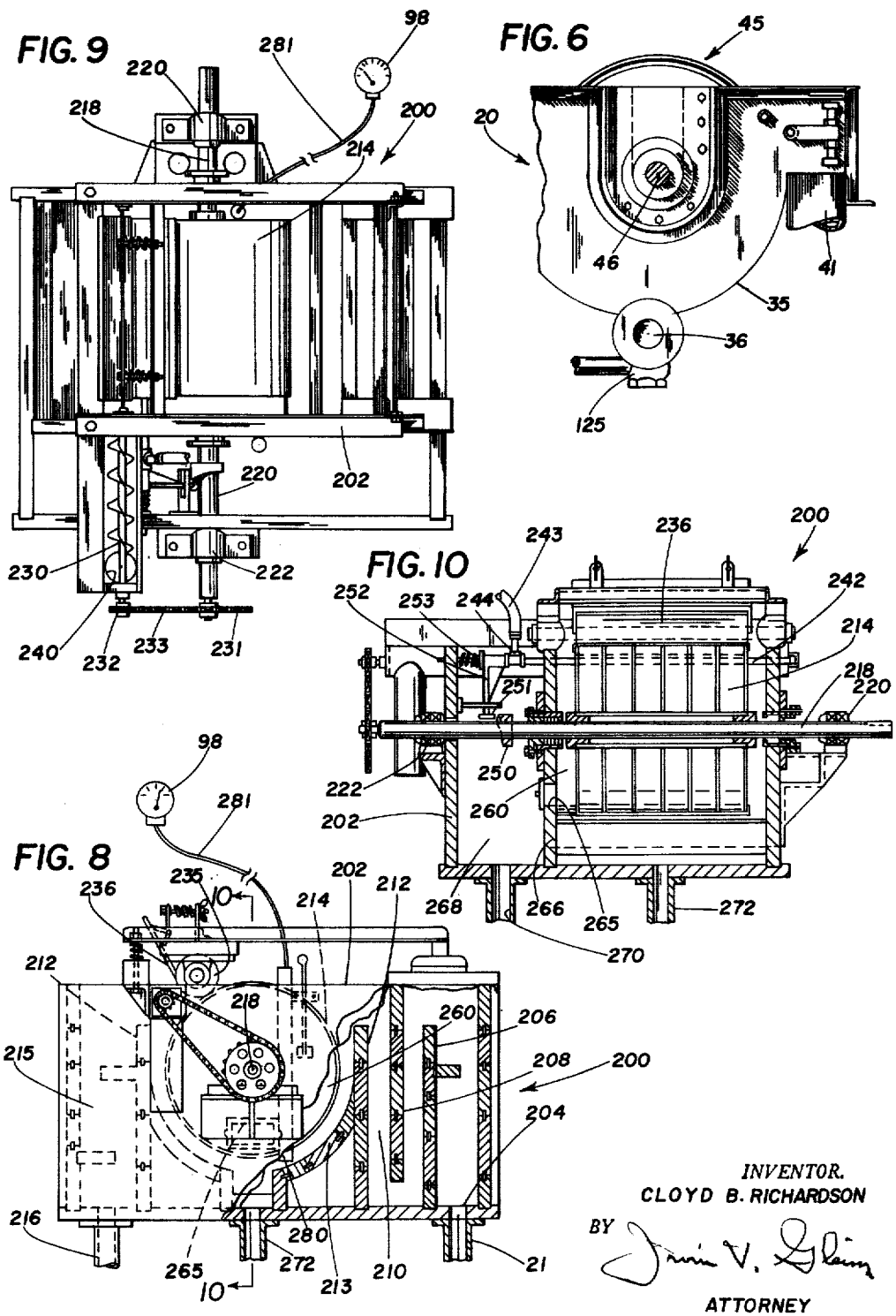

United States Patent Office 3,086,905
Patented Apr. 23, 1963

3,086,905
APPARATUS AND PROCESS FOR CONTINUOUSLY TESTING AND CONTROLLING STOCK FREENESS
Cloyd B. Richardson, Chillicothe, Ohio, assignor to The Mead Corporation, Dayton, Ohio, a corporation of Ohio
Filed Dec. 11, 1958, Ser. No. 779,637
10 Claims. (Cl. 162—198)

This invention relates to an apparatus for continuously testing the freeness of paper stock or slurry and controlling, in accordance with the determined freeness, a stock treating machine such as a Jordan in order that the stock treating machine will provide a continuous supply of paper stock of a predetermined quality.

One of the means for controlling the paper making quality of a stock is to constrain within set limits the freeness characteristics thereof, the freeness being a measure of the rate of water drainage from the pulp. Measuring and controlling the freeness property provides valuable means for controlling the formation of the final paper product.

It is one of the objects of the present invention to provide a novel apparatus for continuously determining the freeness property of the stock after it is treated by a refiner and effecting continuous adjustment of the refiner in accordance with the freeness so that the stock will be of substantially constant freeness to produce a more uniform paper product.

It is a further object of the invention to provide a continuously operating freeness tester which will make accurate quantitative measurements of the paper stock freeness and will immediately respond to changes in the freeness to make adjustments of the refiner, these adjustments being made continuously and promptly.

It is a further object of the invention to provide a freeness tester including a rotary drum which collects a mat of fiber at the outer periphery thereof as the drum rotates within a tub having a quantity of wood pulp slurry sample therein and the measurement of freeness consists in determining the rate of fluid transfer through the drum periphery having the collected mat thereon. The rate of fluid transfer may be measured in several ways including, measuring the height of fluid slurry within the tub, measuring the rate of fluid movement within a chamber contained interiorly of the drum, or measuring the height of fluid passing from the interior of said drum and draining through a fixed orifice.

Another object of the invention is to provide a process or method of continuously evaluating the freeness condition of the stock by measuring the fluid head causing fluid flow through the mat on the rotary drum or by measuring the flow of effluent under constant head conditions and controlling the stock treating apparatus in accordance therewith.

Other objects and features of the invention will become apparent from a detailed description of the following embodiments which proceed with reference to the accompanying drawings wherein:

FIGURE 1 is a schematic view showing the control system as a whole and including the freeness tester and stock treating apparatus;

FIGURE 2 is an enlarged sectional view taken along the length of the freeness testing machine;

FIGURE 3 is a sectional view taken on line 3—3 of FIGURE 2;

FIGURE 4 is a top view of the drive mechanism for the rotary drum;

FIGURE 5 is a sectional view on line 5—5 of FIGURE 2;

FIGURE 6 is an end view of the tub and rotary drum mounted therein looking in the direction of the arrows 6—6 in FIGURE 2;

FIGURE 7 is an enlarged fragmentary view of the rotary drum showing the various screen layers for collecting the mat of pulp fiber at the outer surface thereof;

FIGURE 8 is an elevational view of a second embodiment of the invention having a portion broken away to illustrate the interior thereof;

FIGURE 9 is a top view of the machine shown in FIGURE 8; and

FIGURE 10 is a sectional view taken on line 10—10 of FIGURE 8.

The freeness tester indicated generally by reference numeral 20, FIGURE 1, receives continuously a stream of stock through conduit 21. The stock originates from a stock treating machine such as a Jordan 22 and a portion of the stream of stock leading from the Jordan 22 through conduit 23 is diverted through line 25 to an overflow chamber 26. The diverted stock is then transferred via conduit 27 to a mixing chamber 30 wherein dilution water from chamber 32 is added to provide the desired consistency to the stock. Thorough mixing of the stock may be insured by means of an agitator 33 and suitable heating elements (not shown) may be included to bring the stock to an optimum temperature. However, under normal operating conditions, such agitating and heating means are not ordinarily required in this embodiment of the invention. The stock sample of the desired consistency is then continuously transferred to the freeness tester 20 via conduit 21 where its freeness is continuously measured.

Referring next to details of the freeness tester, with particular reference to FIGURES 2 to 7 inclusive, the freeness tester comprises a tub 35 having an inlet conduit 36 secured to the bottom thereof, and an orifice or slot 37 running the length of the conduit 36. The base of tub 35 permits the incoming stream of stock sample from conduit 21 to flow upwardly as indicated by the arrows in FIGURE 2 to fill the tub 35 to the level line indicated by reference numeral 38. At this level, the stock sample will overflow the spill edge 40 and the excess stock will enter pipe 41 where it is led to the paper making machine (not shown), The result is that the stock sample is maintained at a constant relatively high level within the tub 35.

A cylindrical drum 45 mounted on an axle 46 is journalled on bearings 47 and 48 at the opposite ends thereof to support the drum 45 for rotation within the tub 35. The drum 45 can be of a construction similar to a conventional washer drum but may consist of a metal shell 50 having a number of perforations 52 spaced around the entire surface thereof and having radial spokes 53 extending from the outer shell to bushings 55 which are mounted at spaced points along the shaft 46. The interior of the drum 45 forms a chamber 60 which contains the effluent filtering through the mat of fibers which collect on the outer surface of the drum 45, the effluent being sealed from the stock sample slurry contained within the tub 35 by means of the imperforate end walls 62 and 65 of the drum 45.

The mat of pulp fiber which is filtered from the slurry is collected on a screen 70 of a fine mesh size which is overlaid on a second screen 72 of larger mesh size. Between the two screens and the shell 50 are a number of cross rods 75 which are welded to the shell 50 to provide a mounting for the screens 70 and 72. The mesh size of the screen determines the rate of buildup of the mat of fibers and its choice is a matter of design preference. The mat is removed by a doctor blade 80 which scrapes off the mat of fibers which are transferred to the paper making machine along with the overflow of stock slurry sample via pipe 41.

The effluent is passed from the chamber 60 within the drum 45 through an overflow sleeve 82 which passes through end wall 83 of the vat 35. A packing gland 85 seals the opening in the end wall 83 so that none of the stock slurry sample can leave the tub 35. The packing gland 85 is mounted to the end wall 83 through a plate 87.

The effluent or white water which passes through sleeve 82 spills into a chamber 88 and thence through conduit 90 to a stand pipe 92 having a fixed outlet orifice 95 which drains the white water to a sump (not shown). The chamber 88 is closed at one end by a plate 91 which is cut from the end of the tub and moved sufficiently therefrom to provide an outlet for the sleeve 82. Thus the stand pipe 92 will rise to a higher level because of the chamber 60 at a level 60' below the axis of the horizontal axis 46 a distance equal to the internal radius of the overflow sleeve 82.

A pressure sensing element 97 is located within the stand pipe 92 to measure the height of fluid therein, and a gauge or recorder 98 is connected with the element 97 through line 101. The height of the fluid in the stand pipe 92 provides a measure of the filtration rate through the drum 45 and thereby provides a continuous measurement of the freeness of the stock. Thus, when the freeness of the stock increases so that the effluent will pass more readily through the mat formation on the periphery of the drum, the liquid level of the white water within the stand pipe 92 will rise to higher level because of the orifice 95. This rise of the liquid level is sensed and recorded by recorder 98 and is communicated through line 102 to a motor 103 having gear connections 104 with a control wheel 105 of the Jordan 22, the control wheel 105 is the usual adjustment means provided for movement of the conventional Jordan plug (not shown) so as to control the refining action on the paper stock.

Conversely, when the freeness of the paper pulp decreases so that transfer of effluent through the mat is retarded, then the liquid level of the white water within the stand pipe 92 will drop and this is sensed by member 97 which communicates with recorder 98 through the line 101 and the recorder in turn transmits this information through line 102 to the motor 103 where the adjustments are made to compensate for the decrease of stock freeness.

During operation, the drum 45 is continuously rotated by a motor 108 which acts through a reduction gear 110 having a chain drive 112 which is connected with shaft 46 through a suitable sprocket wheel or the like 113. The drive motor is mounted on a shelf 115 which is part of a frame 120 having legs 122 which support the entire freeness tester structure.

Periodically, the contents of the tub 35 can be drained through an outlet 125 having an outlet valve 126 and a control wheel 127.

In operation, a representative stock sample is diverted from the main stream of stock as a continuous flow and is supplied to the freeness tester 20. The pulp sample may or may not be diluted as conditions require although it is essential that satisfactory consistency control be provided.

The pulp slurry is admitted to the tub 35 in sufficient quantity to provide a constant overflow so that a constant slurry level is maintained within the tub. Therefore, a constant differential between the relatively high slurry level within the tub 35 and the relatively low white water level within the chamber 60 is maintained and the rate of flow through the cylinder 45 is proportional to the freeness of the pulp material forming the mat on the drum 45. This flow rate is measured by the height of fluid head within the stand pipe 92 or may be measured by any other suitable flow meter.

In the second embodiment of the invention shown in FIGURES 8 to 10, the freeness tester, designated generally by reference numeral 200, may be substituted for the freeness tester 20 within the system shown in FIGURE 1. The freeness tester 200 includes a tub 202 which receives a continuous flow of paper stock material diverted from the main flow thereof through line 21 which passes through the inlet 204 (FIGURE 8) and past an overflow weir 206 and a baffle 208 and thence to chamber 210 which includes two upright walls 212 and a curved approximately semi-circular base 213 extending between the two walls 212. Drum 214 is rotatably mounted between the two walls 212. The tub is constructed so as to provide whatever height is required according to design requirements. If the level of the slurry should rise above the height of the walls 212, the overflow can be received within chamber 215 and drained through the outlet line 216.

In this embodiment, a predetermined volume of paper stock sample at the desired consistency and temperature is delivered to the tester 200 and the freeness of the stock is measured by changes in the fluid level of the stock within the tub 202.

The level of the slurry sample changes according to the rate of filtration through the mat of fibers collecting on the screen at its outer shell. The drum is caused to rotate by a shaft 218 which is journalled on bearings 220 and 222 at the opposite ends thereof. The shaft 218 is caused to turn by a motor (not shown) and the shaft power drives a worm 230 through sprocket wheels 231 and 232 and a chain 233.

The mat of fibers which collects on the outer surface of the drum 214 is transferred to a couch roll 235 and a doctor blade 236 then scrapes of the mat which is collected in a trough and conveyed by the worm 230 to an outlet 240 where it can be returned to the system or discarded. The surface of the drum 214 is further rendered free of the mat fiber by means of a high pressure fluid spray which is directed thereagainst by means of a spray line 242. The spray line 242 has a hose 243 connecting with it through a T 244 to transfer fluid under pressure to the spray line 242. The spray line moves back and forth slightly by means of a cam 250 which is geared to the shaft 222 and rotates therewith, there being a cam follower 251 on an arm 252 connected with the spray line 242. A spring 253 maintains the cam follower 251 in engagement with the cam 250. Thus, as the shaft 218 is rotated, the drum 214 is caused to rotate, spray line 242 moves slightly in a back and forth movement and the worm gear 230 displaces the mat fiber which is couched off the drum 214.

Within the rotatable drum is a chamber 260 which is fluid tightly separated from the interior 210 of the tub so that the effluent which passes through the drum periphery and into the chamber 260 does not become mixed with the slurry sample. The white water or effluent is discharged through opening 265 and the wall 266 into chamber 268 where it is discharged through an outlet line 270.

Periodically, the vat, during cleansing operation, can be emptied of its contents through outlet lines 272.

In operation, the constant volume of slurry sample is delivered to the freeness tester as previously described and is of a suitable consistency and temperature. The freeness of the sample is measured directly by the level of slurry sample within the tub 202. For example, when the freeness of the sample is low so that the mat of fibers collecting on the outer periphery of the drum 214 substantially impedes the passage of effluent therethrough, then the level of slurry will rise and this is detected by a pressure sensing member 280, this information being communicated through line 281 to a recorder regulator 98 of the same character previously described and having a similar connection with the motor regulator of the stock treating apparatus (Jordan or the like).

Conversely, when the freeness increases so that the mat of fibers on the outer periphery of the drum offers less resistance to the passage of effluent therethrough then the level of slurry sample will fall and the corresponding reduction of pressure which is sensed by the pressure sensing device 280 will communicate this condition to the regulator 98 in order that adjustment may be made of the paper refiner to alter the stated condition. As a result, the level of the stock slurry within the tub is made a direct measure of the freeness of the stock because a constant volume of stock sample is delivered to the tub and a constant level of white water or effluent is maintained within the chamber 260 at the interior of the drum 214.

Accordingly, a direct measurement of the stock freeness is provided by determining the level of stock sample within the tub 202. In this embodiment, water removal through the cylinder may be by gravity or by vacuum pump and the tub may be of direct flow, counter flow or double flow design. It is not essential to the invention that provision be made for overflow or excess stock. Also, the actuating mechanism for the stock treating apparatus may be either pneumatic or electric according to design preference. Moreover, doctor blade 80 described in connection with the embodiment specifically shown in FIGURE 3, may be eliminated and a couch roll, air or steam jet substituted therefor in order to remove the fiber mat from the outer periphery of the rotating drum 45.

While certain preferred embodiments of the invention have been selected for this disclosure, it is to be understood that these are only exemplary of the invention and are in no way restrictive thereof.

What is claimed is:

1. In combination with a stock refining machine, apparatus for continuously testing the freeness of stock and regulating said stock-refining machine in accordance therewith to continuously control said freeness and comprising, a vat for receiving said stock and having overflow means for maintaining said stock at a constant relatively high level therein, means for delivering stock to said vat at a rate sufficient to produce an overflow under all normal conditions of operation of said machine, a rotatable member mounted for rotation within said vat about a horizontally disposed axis and including means for collecting a mat of fiber at the outer periphery thereof while providing passage of liquid through said member, said rotatable member having end walls imperforate at least in the peripheral portions thereof and defining with said mat collecting means a chamber for collecting white water, an axially disposed overflow means for said chamber sealingly discharging through a wall of said vat, said axially disposed overflow means maintaining a constant relatively low level of liquid in said chamber, said relatively high and low levels being respectively considerably above and below said axis of said rotatable member, means for measuring the rate of liquid passage through said rotatable member and thereby producing a measurement of stock freeness, and means responsive to said measuring means for adjusting said stock-refining machine and thereby continuously controlling the freeness of said stock.

2. In combination with a stock refiner a stock freeness regulating apparatus comprising a stock-receiving vat, means for continuously supplying a stock sample from said refiner to said vat at a constant rate sufficient to maintain a relatively high level of the stock in said vat, a screen member rotatably mounted about a horizontally disposed axis in said vat and having a chamber therein defined by said screen member and by peripherally imperforate end walls for receiving the effluent from said stock sample passing through said screen member, overflow means for maintaining a substantially constant relatively low level of said effluent within said chamber under constant pressure conditions, sensing means in said vat for measuring the level of said stock in said vat as a measure of the freeness thereof, and control means responsive to said sensing means for effecting regulation of said stock refiner, said relatively high and low levels being respectively considerably above and below said axis.

3. In combination with a stock refiner, a stock freeness regulating apparatus comprising a stock-receiving vat, means for supplying stock to said vat at a constant rate, said rate being sufficient to maintain a relatively high level of stock in said vat, a rotatable member mounted for rotation about a horizontally disposed axis within said vat and including means for collecting a mat of fiber at the outer periphery thereof while providing passage of liquid through said member, said rotatable member having a chamber therein defined by said mat collecting means and by peripherally imperforate end walls and an axially disposed overflow means for maintaining a constant relatively low level of liquid in said chamber under constant pressure conditions, means for measuring the rate of liquid passage through said rotatable member and thereby producing a measurement of stock freeness, and means responsive to said measuring means for adjusting said stock refiner and thereby controlling the freeness of said stock, said relatively high and low levels being respectively considerably above and below said axis.

4. A combination as set forth in claim 3 wherein said means for measuring the rate of liquid passage through said rotatable member includes means for measuring the level of the stock in the vat.

5. In combination, a vat, means for supplying paper stock to said vat at a constant rate sufficient to maintain a relatively high level of stock in said vat, a rotatable member mounted for rotation about a horizontally disposed axis in said vat and including means for collecting a mat of fiber at the outer periphery thereof while providing passage of liquid through said member, said rotatable member having a chamber therein defined by said mat collecting means and by peripherally imperforate end walls and an overflow means for maintaining a constant relatively low level of liquid in said chamber under constant pressure conditions, and means for measuring the rate of liquid passage through said rotatable member and thereby providing a measurement of stock freeness, said relatively high and low levels being respectively considerably above and below said axis.

6. A combination as set forth in claim 5 wherein said means for measuring the rate of liquid passage through said rotatable member includes means for measuring the rate of flow of fluid through said overflow means of said rotatable member and overflow means for maintaining the stock at a constant level in said vat.

7. A combination as set forth in claim 5 wherein said means for measuring the rate of liquid passage through said rotatable member includes level sensing means in said vat for measuring the level of the stock in the vat.

8. A freeness tester and regulating apparatus in combination with a stock treating machine comprising a stock receiving vat, means for delivering a surplus volume of said stock to said tester so that there is a continuous overflow from said vat at a relatively high level, a drum rotatably mounted about a horizontally disposed axis in said vat and having a perforated shell adapted to collect a mat of fiber thereon as said stock is caused to filter therethrough, means for collecting the effluent of said flow interiorly of said drum, overflow means for maintaining a substantially constant relatively low effluent fluid height within said effluent-collecting means under constant pressure conditions whereby the change in fluid flow through said perforated shell of said rotatable drum is a direct measure of the freeness of said stock, means for measuring said flow through said perforated shell of said drum within said vat, and means for regulating operation of said stock-treating machine in accordance with said measuring means, said high and low levels being respectively considerably above and below said axis.

9. In combination with a stock refiner, a stock freeness regulating apparatus comprising a stock-receiving vat, means for supplying stock to said vat at a rate sufficient to maintain a relatively high level of stock in said vat, a rotatable member mounted for rotation about a horizontally disposed axis within said vat and including means for collecting a mat of fiber at the outer periphery thereof while providing passage of liquid through said member, said rotatable member having a chamber therein defined by said mat collecting means and by peripherally imperforate end walls and an axially disposed overflow means for maintaining a constant relatively low level of liquid in said chamber under constant pressure conditions, means for measuring the rate of liquid passage through said rotatable member and thereby producing a measurement of stock freeness, and means responsive to said measuring means for adjusting said stock refiner and thereby controlling the freeness of said stock, said relatively high and low levels being respectively considerably above and below said axis, said means for measuring the rate of liquid passage through said rotatable member including means for measuring the rate of flow of fluid through said overflow means of said rotatable member and means for maintaining the stock at a constant level in said vat.

10. A process for continuously testing and controlling the freeness of paper stock material comprising the steps of diverting a substantially continuous flow of paper stock from a stock refining apparatus to a container at a rate to maintain a relatively high constant level of stock therein, rotating a peripherally perforated filtering drum about a horizontally disposed axis within the paper stock in said container thereby forming a mat of fibers on the outer surface of said filtering drum as fluid from said stock filters through said mat into said filtering drum, maintaining a relatively low constant level of fluid in said filtering drum by gravity overflow therefrom under constant pressure conditions, measuring the rate of flow of said fluid through said mat to determine the freeness of said stock, and regulating said stock refining apparatus in accordance with the determined freeness of said stock, said relatively high and low levels being respectively considerably above and below said axis.

References Cited in the file of this patent

UNITED STATES PATENTS

| | | |
|---|---|---|
| Re. 19,997 | Witham | June 2, 1936 |
| 1,653,125 | Schur | Dec. 20, 1927 |
| 2,027,660 | Wells | Jan. 14, 1936 |
| 2,368,004 | Cram | Jan. 23, 1945 |
| 2,392,026 | Cram | Jan. 7, 1946 |
| 2,577,712 | Nilson | Dec. 4, 1951 |
| 2,729,147 | Prevost | Jan. 3, 1956 |
| 2,826,061 | Forsten et al. | Mar. 11, 1958 |

UNITED STATES PATENT OFFICE
CERTIFICATE OF CORRECTION

Patent No. 3,086,905                                              April 23, 1963

Cloyd B. Richardson

It is hereby certified that error appears in the above numbered patent requiring correction and that the said Letters Patent should read as corrected below.

In the heading to the drawings, Sheets 1 to 3, title of invention, for "APPARATUS AND PROCESS FOR CONTINUOUSLY TESTING CONTROLLING STOCK FREENESS" read -- APPARATUS AND PROCESS FOR CONTINUOUSLY TESTING AND CONTROLLING STOCK FREENESS --; column 3, line 17, beginning with "the stand pipe" strike out all to and including "sleeve 82." in line 20, and insert instead -- the overflow sleeve maintains the white water in the chamber 60 at a level 60' below the axis of the horizontal axis 46 a distance equal to the internal radius of the overflow sleeve 82. --.

Signed and sealed this 12th day of November 1963.

(SEAL)
Attest:

ERNEST W. SWIDER                                    EDWIN L. REYNOLDS

Attesting Officer                                   Acting Commissioner of Patents